United States Patent
Hara et al.

(10) Patent No.: US 8,833,857 B2
(45) Date of Patent: Sep. 16, 2014

(54) VEHICLE SEAT

(75) Inventors: Yoshiro Hara, Ichinomiya (JP); Yuichi Matsui, Owariasahi (JP); Yukinori Sugiura, Nissin (JP); Tatsuya Ono, Toyota (JP); Takashi Okada, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/185,829

(22) Filed: Jul. 19, 2011

(65) Prior Publication Data

US 2012/0019039 A1    Jan. 26, 2012

(30) Foreign Application Priority Data

Jul. 22, 2010   (JP) .................................. 2010-164925

(51) Int. Cl.
*B60N 2/12*   (2006.01)
*B60N 2/68*   (2006.01)

(52) U.S. Cl.
CPC ........................................ *B60N 2/68* (2013.01)
USPC .................................... 297/344.1; 297/452.18

(58) Field of Classification Search
USPC .................................. 297/341, 344.1, 452.18
See application file for complete search history.

(56) References Cited

U.S. PATENT DOCUMENTS

| | | | | |
|---|---|---|---|---|
| 3,131,971 A | * | 5/1964 | Gunn ........................... | 297/446.2 |
| 4,015,877 A | * | 4/1977 | Button ........................... | 297/341 |
| 4,043,593 A | * | 8/1977 | Turner ........................... | 297/341 |
| 4,152,024 A | * | 5/1979 | Farelli ........................... | 297/341 |
| 5,310,247 A | * | 5/1994 | Fujimori et al. ......... | 297/378.12 |
| 5,582,463 A | * | 12/1996 | Linder et al. ................ | 297/452.2 |
| 6,152,533 A | * | 11/2000 | Smuk ............................. | 297/341 |
| 7,350,867 B2 | * | 4/2008 | Park ........................... | 297/378.12 |
| 2005/0046256 A1 | * | 3/2005 | Yamada ..................... | 297/344.1 |
| 2009/0080814 A1 | * | 3/2009 | Kojima et al. .................. | 384/34 |

(Continued)

FOREIGN PATENT DOCUMENTS

| | | |
|---|---|---|
| JP | 56-63527 | 5/1981 |
| JP | 7-051145 | 2/1995 |
| JP | 2002-219974 | 8/2002 |
| WO | WO 2009/072321 | * 6/2009 |

OTHER PUBLICATIONS

U.S. Appl. No. 13/187,908 to Tatsuya Ono et al., filed Jul. 21, 2011.

(Continued)

*Primary Examiner* — David R Dunn
*Assistant Examiner* — Richard Lowry
(74) *Attorney, Agent, or Firm* — Greenblum & Bernstein, P.L.C.

(57) ABSTRACT

A vehicle seat includes a pair of lower rails that are attached to a vehicle floor and extend parallel to one another, a pair of upper rails that are slidably attached to the lower rails, and a seat cushion that is attached to the pair of upper rails. The seat cushion includes i) a pair of pipe members, each pipe member being a single member that includes a long portion that extends along the corresponding upper rail, and a leg portion that extends downward from a first end portion of the long portion and that is attached to the corresponding upper rail; ii) a first connecting pipe that connects the first end portions of the pair of long portions together; and iii) a pair of plate members extending from the upper rails to the long portions, and attached to second end portions of the long portions.

4 Claims, 6 Drawing Sheets

(56) References Cited

U.S. PATENT DOCUMENTS

2009/0167073 A1* 7/2009 Fujieda .................... 297/452.18
2010/0244524 A1* 9/2010 Kumazaki et al. ............ 297/341
2011/0006580 A1* 1/2011 Ishimoto et al. ......... 297/452.18

OTHER PUBLICATIONS

U.S. Appl. No. 13/097,384 to Kousuke Sei et al., filed Apr. 29, 2011.
Japanese Office action dated Jan. 27, 2014 along with a parital English-language translation thereof.

* cited by examiner

VEHICLE SEAT

INCORPORATION BY REFERENCE

The disclosure of Japanese Patent Application No. 2010-164925 filed on Jul. 22, 2010 including the specification, drawings and abstract is incorporated herein by reference in its entirety.

BACKGROUND OF THE INVENTION

1. Field of the Invention

The invention relates to a vehicle seat mounted in a vehicle or the like.

2. Description of Related Art

A vehicle seat according to related art has a pair of lower rails that are attached to a vehicle floor and extend parallel to one another, a pair of upper rails that are slidably attached to the pair of lower rails, and a seat cushion that is attached to the pair of upper rails (see Japanese Patent Application Publication No. 7-51145 (JP-A-7-51145) and Japanese Patent Application Publication No. 56-63527 (JP-A-56-63527)). The seat cushion described in JP-A-7-51145 has a plurality of pipe members that are connected together as a frame, and a plurality of brackets that attach the pipe members to the upper rails.

The seat cushion described in JP-A-56-63527 has a pair of plate members and a pipe member as the frame. The pipe member is a single member that includes long portions that extend along upper rails, leg portions that extend downward from first end portions of the long portions and that are attached to upper rails, and a connecting portion that connects the lower portions of the two leg portions together. Each plate member extends from the corresponding upper rail to the corresponding long portion, and is attached to a second end portion of the corresponding long portion.

However, the seat cushion described in JP-A-7-51145 has many parts, and a manufacturing process is necessary to connect each pipe. The seat cushion in JP-A-56-63527 has few parts, but is not strong. Therefore, there is a need for a strong vehicle seat having few parts.

SUMMARY OF THE INVENTION

The invention provides a strong vehicle seat having few parts. The vehicle seat according to one aspect of the invention includes a pair of lower rails that are attached to a vehicle floor and extend parallel to one another, a pair of upper rails that are slidably attached to the lower rails, and a seat cushion that is attached to the pair of upper rails. The seat cushion includes i) a pair of pipe members, each pipe member being a single member that includes a long portion that extends along a corresponding one of the upper rails, and a leg portion that extends downward from a first end portion of the long portion and that is attached to the corresponding one of the upper rails; ii) a first connecting pipe that connects the first end portion of the long portion of one of the pipe members to the first end portion of the long portion of the other of the pipe members; and iii) a pair of plate members, each plate member extending from a corresponding one of the upper rails to the long portion of a corresponding one of the pipe members, and being attached to a second end portion of the long portion of the corresponding one of the pipe members.

In this way, the seat cushion has a pair of pipe members, and each pipe member is a single member that includes a long portion and a leg portion. As a result, the seat cushion is able to be structured with fewer parts than the seat cushion described in JP-A-7-51145. Each of the pipe members may be attached to the upper rail by the leg portion that extends downward from one end portion of the long portion. One end portion of the long portion of one pipe member is connected to one end portion of the long portion of the other pipe member by a first connecting pipe. Accordingly, the one end portions of the long portions of the pipe members are strengthened by the leg portions and the connecting pipe. The second end portion of the long portion of each pipe member is attached to a corresponding upper rail by a plate member. Accordingly, the second end portions of the long portions are able to be attached to the upper rails with fewer parts.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One example embodiment of the invention will now be described with reference to FIGS. 1 to 5. A vehicle seat 1 is a seat that is mounted in a vehicle or the like, and has a seat cushion 2, a seat back 3, and a pair of sliding devices 4, as shown in FIG. 1.

Figure 2:
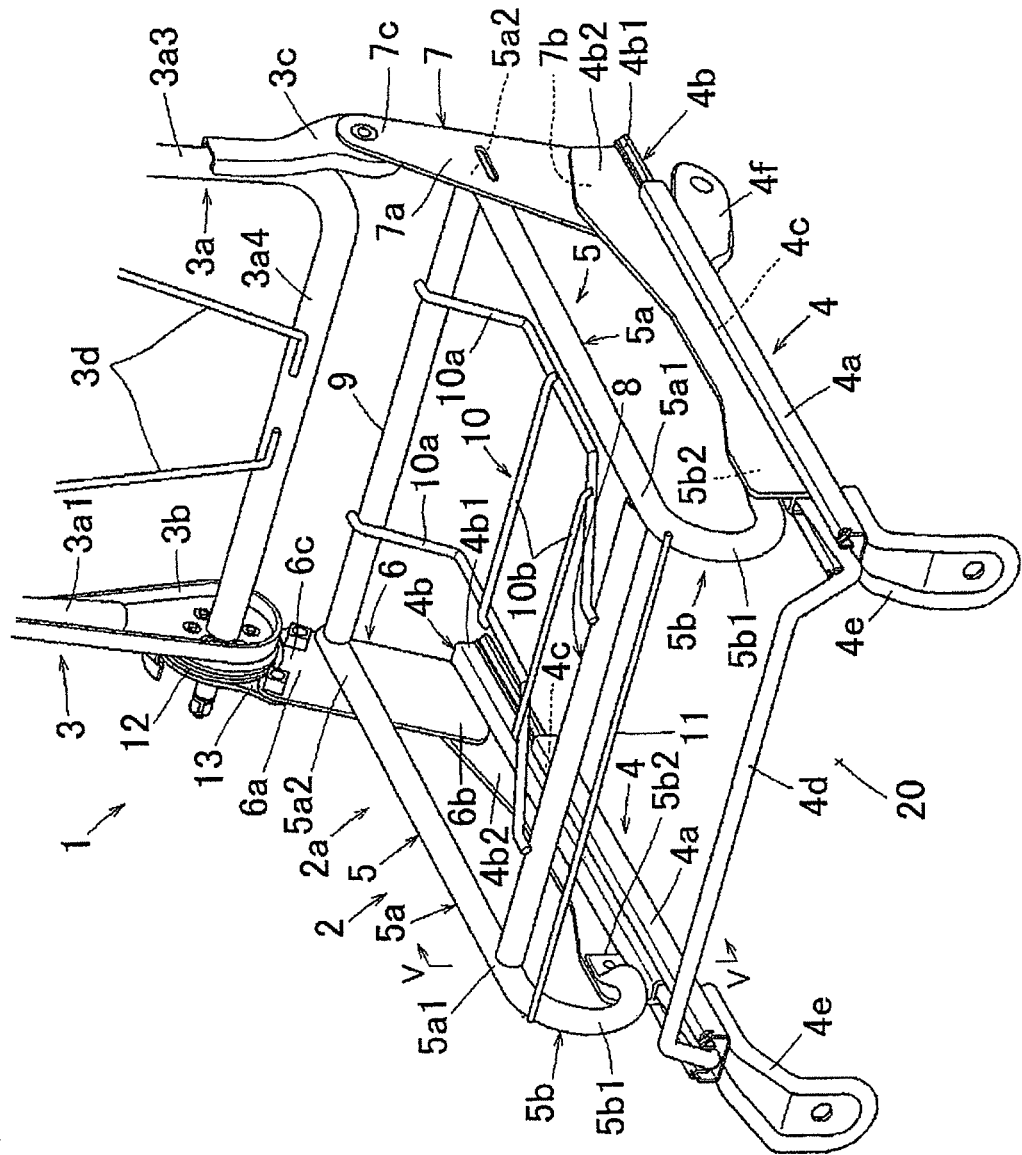
FIG. 2 is a perspective view of part of the vehicle seat according to the example embodiment.
Figure 5:
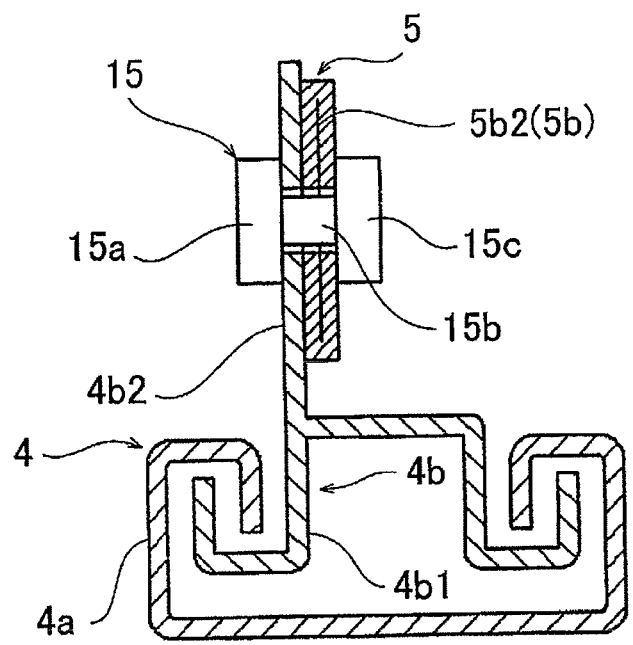
FIG. 5 is a sectional view taken along line V-V in FIG. 2.

Each sliding device 4 has a lower rail 4a and an upper rail 4b, as shown in FIGS. 2 and 5. The lower rails 4a are mounted to a vehicle floor 20 by mounting members 4e to 4g. The pair of lower rails 4a are arranged so as to be parallel to each other. Each upper rail 4b is a single member that includes a main body portion 4b1 that is slidably attached to the corresponding lower rail 4a, and a flange portion 4b2 that stands upright on the main body portion 4b1 and extends upward from the main body portion 4b1.

A lock mechanism 4c that releasably locks the lower rail 4a to the upper rail 4b is provided between each lower rail 4a and each upper rail 4b, as shown in FIG. 2. The pair of lock mechanisms 4c are connected together by a release lever 4d. This release lever 4d extends in the seat width direction under the front of the seat cushion 2. The pair of lock mechanisms 4c are able to be unlocked by pulling up on the release lever 4d.

Figure 1:
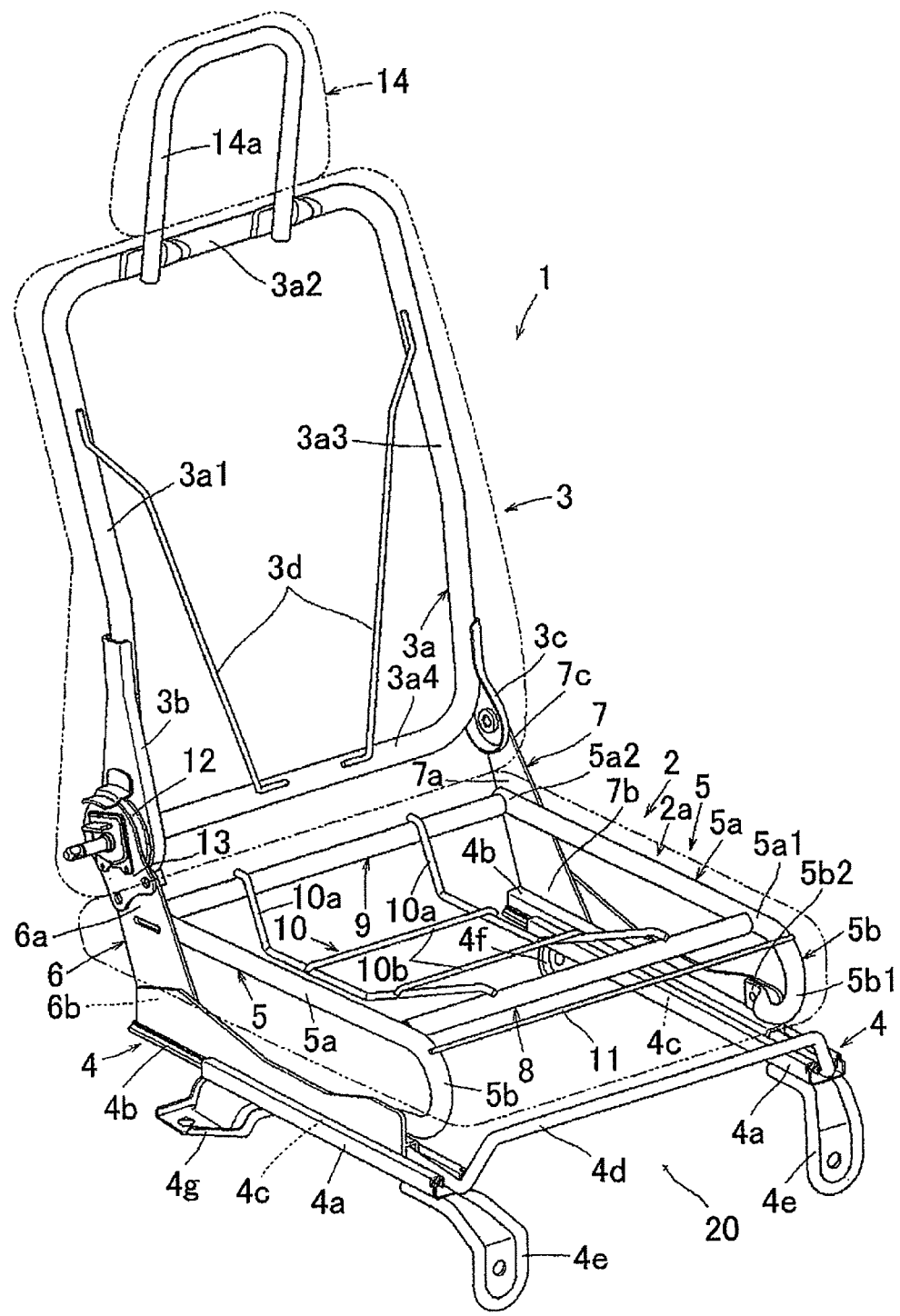
FIG. 1 is a perspective view of a vehicle seat according to one example embodiment of the invention.

The seat cushion 2 has a frame 2a, as shown in FIGS. 1 and 2, a pad, not shown, that is attached to the frame 2a, and a cover that covers the pad. The frame 2a has a pair of left and right pipe members 5, a pair of front and rear connecting pipes 8 and 9 (i.e., a first connecting pipe 8 and a second connecting pipe 9), and a pair of left and right plate members 6 and 7.

Figure 3:
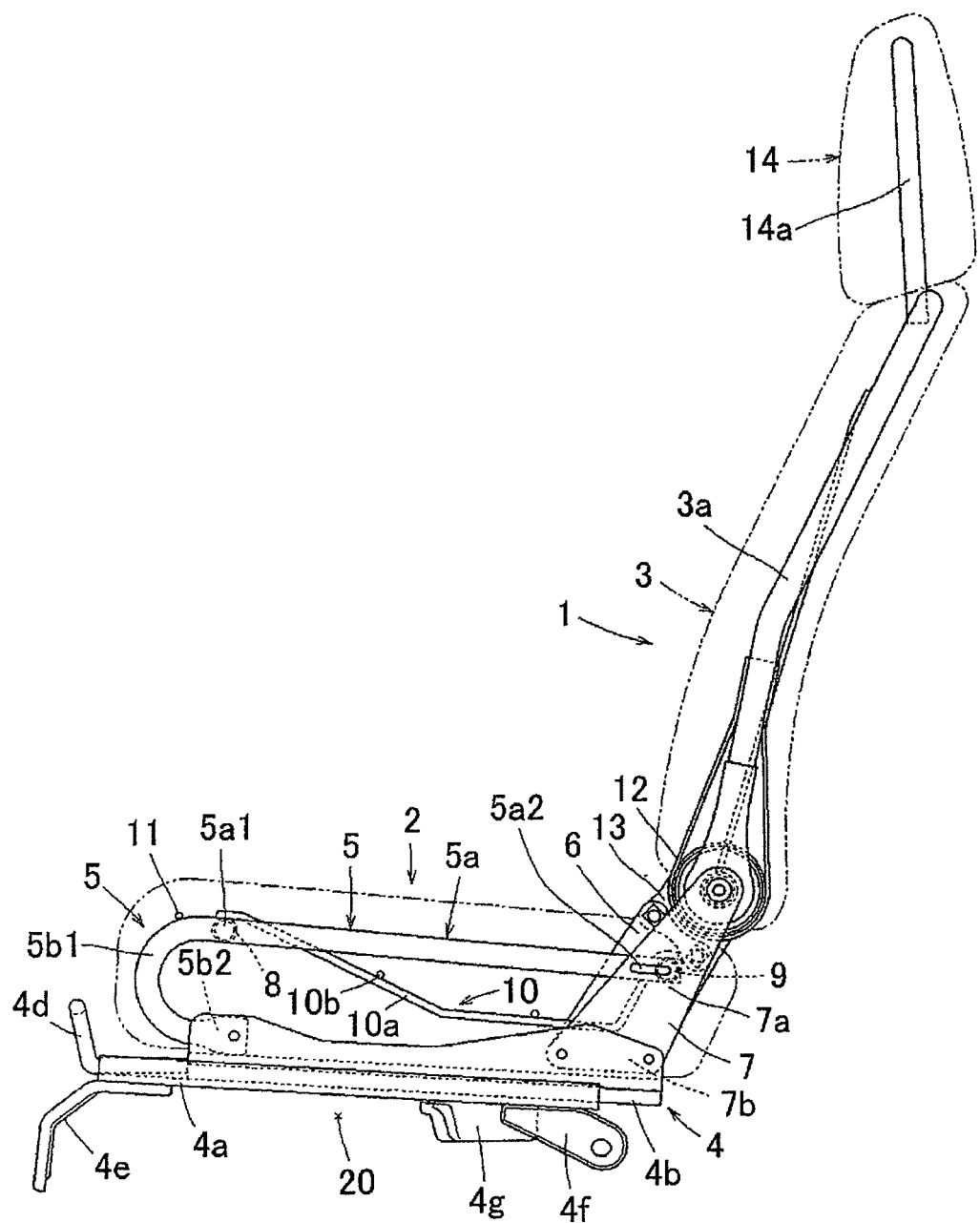
FIG. 3 is a side view of the vehicle seat according to the example embodiment.

The pipe members 5 are hollow and preferably have circular cross-sections, as shown in FIGS. 2 and 3. Each pipe member 5 is a single member that includes a long portion 5a and a leg portion 5b. The long portion 5a extends in the longitudinal direction along the upper rail 4b, above the upper rail 4b. The long portion 5a has a first end portion 5a1 at a front portion, and a second end portion 5a2 at a rear portion.

The leg portion 5b has a main body portion 5b1 that extends downward from the first end portion 5a1 of the long portion 5a, and an attaching portion 5b2 formed on an end portion of the main body portion 5b1, as shown in FIGS. 2 and 3. The main body portion 5b1 is formed in a general arc shape, and extends forward and downward from the first end portion 5a1 of the long portion 5a, and then continues to extend downward and toward the rear.

The attaching portion 5b2 is positioned substantially directly below the first end portion 5a1 of the long portion 5a and is attached to the upper rail 4b, as shown in FIGS. 2 and 3. The attaching portion 5b2 is generally plate-shaped and is formed by crushing the thickness of the end portion of the leg portion 5b in the seat width direction. The attaching portion 5b2 abuts against one side surface (i.e., the surface on the center side in the seat width direction) of the flange portion 4b2 of the upper rail 4b, as shown in FIGS. 2 and 5. The attaching portion 5b2 is attached to the flange portion 4b2 by a pin member 15. The pin member 15 has a shaft portion 15b that passes through the attaching portion 5b2 and the flange portion 4b2, a head portion 15a that abuts against a first side surface of the flange portion 4b2, and a crushed portion 15c that abuts against a second side surface of the flange portion 4b2 by the end portion of the shaft portion 15b being crushed.

The second end portion 5a2 of the long portion 5a is positioned above the upper rail 4b, at substantially the same height as the first end portion 5a1 or slightly lower than the first end portion 5a1, as shown in FIGS. 2 and 3. The second end portion 5a2 abuts against the seat center side surface of the plate member 6 and 7. The second end portion 5a2 is attached to a center region 6a and 7a of the plate member 6 and 7 by welding or the like.

A lower region 6b and 7b of the plate member 6 and 7 abuts against the seat center side surface of the flange portion 4b2 of the upper rail 4b, as shown in FIG. 2. The lower region 6b and 7b is attached to the flange portion 4b2 by welding or the like. A bracket 13 is attached to an upper region 6c of the plate member 6. A bracket 3c is rotatably attached to an upper region 7c of the plate member 7.

The first and second connecting pipes 8 and 9 are hollow and preferably have circular cross-sections, as shown in FIG. 2. The first and second connecting pipes 8 and 9 extend in the seat width direction, and extend linearly between the pair of long portions 5a. The end portions of the first connecting pipe 8 are attached by welding or the like to the first end portions 5a1 of the long portions 5a of the pipe members 5. The end portions of the second connecting pipe 9 are attached by welding or the like to the second end portions 5a2 of the long portions 5a.

A wire body 10 is attached to the first and second connecting pipes 8 and 9, as shown in FIG. 2. The wire body 10 is formed by a plurality of longitudinal portions 10a and a plurality of transverse portions 10b integrally connected together. The front end portion of each longitudinal portion 10a is attached to the first connecting pipe 8, and the rear portion of each longitudinal portion 10a is attached to the second connecting pipe 9. The end portions of the transverse portions 10b are attached to the longitudinal portions 10a. A wire 11 is attached between the leg portions 5b of the pair of pipe members 5. A pad is placed on the wire body 10 and the wire 11.

Figure 4:
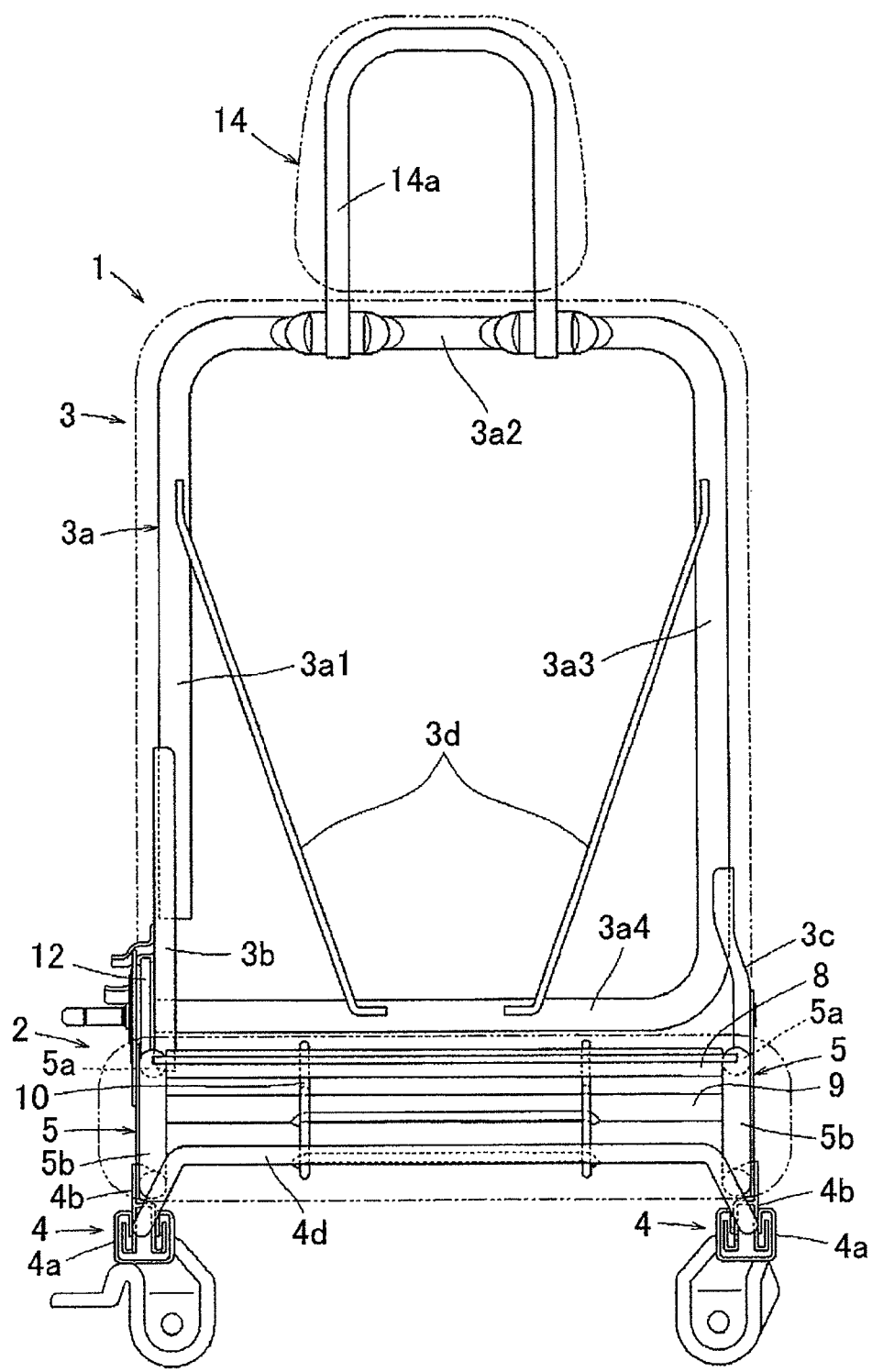
FIG. 4 is a front view of the vehicle seat according to the example embodiment.

The seat back 3 is connected to a rear portion of the seat cushion 2 by a reclining apparatus 12, as shown in FIGS. 1 and 4, in a manner that enables the back angle to be adjusted.

The reclining apparatus 12 is connected to the plate member 6 of the seat cushion 2 by the bracket 13. A side panel 3b extends upward from the reclining apparatus 12, and a frame 3a of the seat back 3 is attached to the side panel 3b by welding or the like.

The seat back 3 has the frame 3a, as shown in FIGS. 1 and 4, a pad, not shown, that is attached to the frame 3a, and a cover that covers the pad. The frame 3a is a single member that includes a first side portion 3a1, an upper portion 3a2, a second side portion 3a3, and an under portion 3a4. The first side portion 3a1 extends upward from the side panel 3b and along the side surface of the seat back 3. The upper portion 3a2 extends in the seat width direction from an upper end portion of the first side portion 3a1. A frame 14a of a headrest 14 is attached to the upper portion 3a2.

The second side portion 3a3 extends downward from one end portion of the upper portion 3a2, as shown in FIGS. 1 and 4. A lower portion of the second side portion 3a3 is attached to the bracket 3c by welding or the like. The bracket 3c is rotatably attached to the upper region 7c of the plate member 7. Therefore, the frame 3a is rotatably connected to the seat cushion 2 by the bracket 3c and the reclining apparatus 12.

The under portion 3a4 of the frame 3a extends toward the side panel 3b from the lower portion of the second side portion 3a3, as shown in FIGS. 1 and 4. A tip end portion of the under portion 3a4 is attached to the side panel 3b by welding or the like. Wires 3d are attached between the first side portion 3a1 and the under portion 3a4, and between the second side portion 3a3 and the under portion 3a4.

As described above, the vehicle seat 1 has the pair of lower rails 4a that are attached to the vehicle floor 20 and extend parallel to one another, the pair of upper rails 4b that are slidably attached to the lower rails 4a, and the seat cushion 2 that is attached to the pair of upper rails 4b, as shown in FIG. 2. The seat cushion 2 has the pair of pipe members 5, the first connecting pipe 8, and the pair of plate members 6 and 7. Each pipe member 5 is a single member that includes the long portion 5a that extends along the corresponding upper rail 4b, and the leg portion 5b that extends downward from the first end portion 5a1 of the long portion 5a and is attached to the corresponding upper rail 4b. The first connecting pipe 8 connects the first end portions 5a1 of the pair of long portions 5a together. The pair of plate members 6 and 7 extend from the upper rails 4b to the long portions 5a, and are attached to the second end portions 5a2 of the long portions 5a.

Accordingly, the seat cushion 2 has the pair of pipe members 5, and each pipe member 5 is a single member that includes the long portion 5a and the leg portion 5b. Thus, the seat cushion 2 is able to be made with fewer parts than the seat cushion described in JP-A-7-51145 and the like. The pipe members 5 are attached to the upper rails 4b by the leg portions 5b that extend downward from the first end portions 5a1 of the long portions 5a, and the first end portion 5a1 of the long portion 5a of one pipe member 5 is connected to the first end portion 5a1 of the long portion 5a of the other pipe member 5 by the first connecting pipe 8. Therefore, the first end portions 5a1 of the long portions 5a of the pipe members 5 are strengthened by the leg portions 5b and the first connecting pipe 8. The second end portions 5a2 of the long portions 5a of the pipe members 5 are attached to the upper rails 4b by the plate members 6 and 7. Therefore, the second end portions 5a2 of the long portions 5a are able to be attached to the upper rails 4b with fewer parts.

Each leg portion 5b has the attaching portion 5b2 that attaches to the upper rail 4b substantially directly below the first end portion 5a1 of the long portion 5a, as shown in FIG. 3. Accordingly, when the first connecting pipe 8 that is connected to the first end portions 5a1 of the long portions 5a receives force downward, this force is transmitted to the first end portions 5a1 of the long portions 5a, and then transmitted to the upper rails 4b via the attaching portions 5b2 of the leg portions 5b that are positioned substantially directly below the first end portions 5a1. Therefore, the pipe members 5 tend not to receive torque that may be generated by positional offset of the first end portions 5a1 of the long portions 5a and the attaching portions 5b2 of the leg portions 5b.

The second connecting pipe 9 that connects the second end portions 5a2 of the long portions 5a is provided between the pair of pipe members 5, as shown in FIG. 2. Therefore, the second end portions 5a2 of the long portions 5a of the pipe members 5 are reinforced by the second connecting pipe 9. Thus, torsion in the pipe members 5 can be suppressed by this second connecting pipe 9.

The first and second connecting pipes 8 and 9 extend in the seat width direction, as shown in FIG. 2, and are joined at both end portions to the pair of pipe members 5 by welding. Therefore, any variation in the lengths of the first and second connecting pipes 8 and 9 is able to be absorbed by the welds of the first and second connecting pipes 8 and 9 and the pipe members 5.

Figure 6:
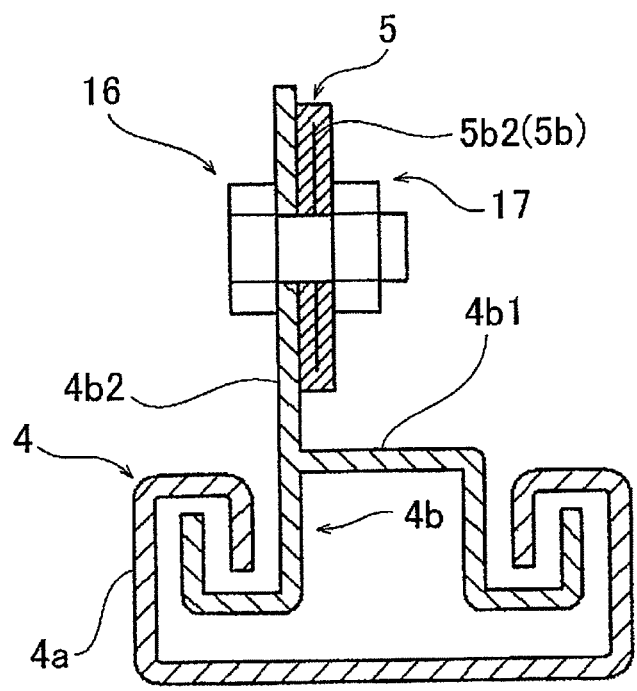
FIG. 6 is a sectional view corresponding to FIG. 5, according to another example embodiment of the invention.
Figure 7:
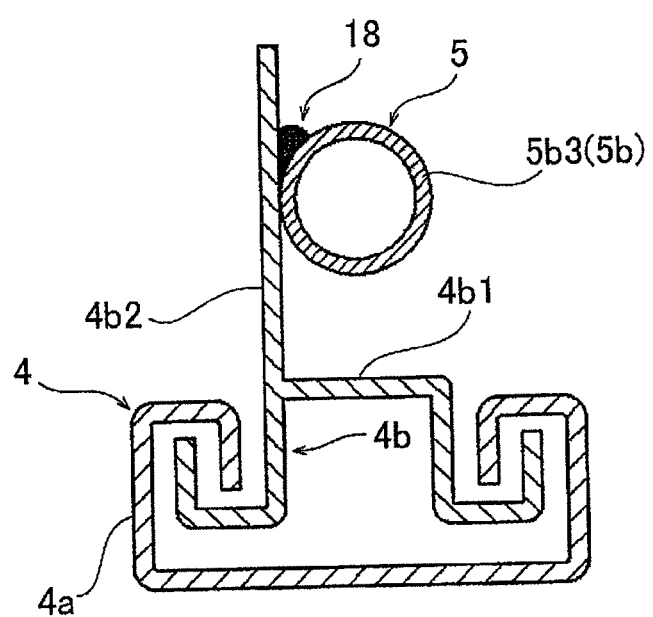
FIG. 7 is a sectional view corresponding to FIG. 5, according to yet another example embodiment of the invention.

The invention is not limited to the example embodiment described above. That is, other example embodiments, such as those described below, are also possible. In another example embodiment, the attaching portion 5b2 of the leg portion 5b may be attached to the flange portion 4b2 by a bolt 16 and a nut 17, as shown in FIG. 6. Alternatively, in yet another example embodiment, the leg portion 5b may have a cylindrical attaching portion 5b3, and the outer peripheral surface of this attaching portion 5b3 may be attached to the flange portion 4b2 by a weld 18, as shown in FIG. 7.

In still another example embodiment, the cross-section of the pipe members 5 and the first and second connecting pipes 8 and 9 may have a polygonal shape (such as triangular or quadrilateral), an oval shape, or another shape. In yet another example embodiment, the seat back 3 may be attached to the pair of plate members 6 and 7 at portions closer to the first end portion 5a1. In still another example embodiment, the seat back 3 may be attached on the side of only one pipe member 5.

In another example embodiment, the seat 1 may not have the second connecting pipe 9. In yet another example embodiment, the seat 1 may be mounted in an aircraft or marine vessel or the like.

What is claimed is:

1. A vehicle seat comprising:
   a pair of lower rails that are attached to a vehicle floor and extend parallel to one another;
   a pair of upper rails that are slidably attached to the lower rails; and
   a seat cushion that is attached to the pair of upper rails, the seat cushion including:
   i) a pair of pipe members, each pipe member being a single member that includes a long portion that extends along a corresponding one of the upper rails, and a leg portion that extends forward and downward from a first end portion of the long portion and that is attached to the corresponding one of the upper rails;
   ii) a first connecting pipe that connects the first end portion of the long portion of one of the pipe members to the first end portion of the long portion of the other of the pipe members, and is provided below a reclining apparatus rotation axis of the vehicle seat; and
   iii) a pair of plate members, each plate member extending from a corresponding one of the upper rails to the long portion of a corresponding one of the pipe members, and being attached to a second end portion of the long portion of the corresponding one of the pipe members, wherein
   the leg portion of each pipe member has an attaching portion that attaches to the upper rail,
   the first end portion of each pipe member has a joining portion that joins the first connecting pipe to the pipe member, and
   the attaching portion is generally provided directly below the joining portion.

2. The vehicle seat according to claim 1, wherein a second connecting pipe that connects the second end portion of the long portion of one of the pipe members to the second end portion of the long portion of the other of the pipe members is provided between the pair of pipe members.

3. The vehicle seat according to claim 2, wherein the second connecting pipe is provided below the reclining mechanism rotation axis of the vehicle seat.

4. The vehicle seat according to claim 1, wherein the leg portion of each pipe member has a main body portion that extends forward and downward in an arc-shaped manner from the first end portion of the long portion.

* * * * *